(12) United States Patent
McKenna

(10) Patent No.: US 9,102,534 B2
(45) Date of Patent: Aug. 11, 2015

(54) CONVERSION OF HYDROCARBONS TO CARBON DIOXIDE AND ELECTRICAL POWER

(75) Inventor: Mark McKenna, Stockton on Tees (GB)

(73) Assignee: Johnson Matthey PLC, London (GB)

( * ) Notice: Subject to any disclaimer, the term of this patent is extended or adjusted under 35 U.S.C. 154(b) by 650 days.

(21) Appl. No.: 13/518,283

(22) PCT Filed: Nov. 30, 2010

(86) PCT No.: PCT/GB2010/051990
§ 371 (c)(1),
(2), (4) Date: Sep. 14, 2012

(87) PCT Pub. No.: WO2011/077106
PCT Pub. Date: Jun. 30, 2011

(65) Prior Publication Data
US 2013/0008175 A1 Jan. 10, 2013

(30) Foreign Application Priority Data
Dec. 22, 2009 (GB) .................................. 0922410.6

(51) Int. Cl.
*C01B 3/38* (2006.01)
*C01B 3/48* (2006.01)
(Continued)

(52) U.S. Cl.
CPC . *C01B 3/382* (2013.01); *C01B 3/48* (2013.01); *C01B 3/501* (2013.01); *C01B 3/52* (2013.01);
(Continued)

(58) Field of Classification Search
CPC ............... F02C 3/20; F02C 3/22; F02C 3/30; C01B 3/382; C01B 3/48; C01B 3/52; C01B 3/501; F01K 23/06; F01K 23/064; F22B 1/1807

USPC .................................. 60/39.461, 39.465, 780
See application file for complete search history.

(56) References Cited

U.S. PATENT DOCUMENTS

| | | | |
|---|---|---|---|
| 4,910,228 A | 3/1990 | Lywood | |
| 2007/0130957 A1 | 6/2007 | Hoffmann et al. | |

(Continued)

FOREIGN PATENT DOCUMENTS

| | | |
|---|---|---|
| GB | 1 578 270 | 11/1980 |
| WO | WO-97/05947 A1 | 2/1997 |

(Continued)

OTHER PUBLICATIONS

Nord et al., "Design and off-design analyses of a pre-combustion $CO_2$ capture process in a natural gas combined cycle power plant," *International Journal of Greenhouse Gas Control*, 2009, vol. 3, pp. 385-392.

(Continued)

*Primary Examiner* — Gerald L Sung
*Assistant Examiner* — Scott Walthour
(74) *Attorney, Agent, or Firm* — RatnerPrestia

(57) ABSTRACT

A process for reducing $CO_2$ emissions from combined cycle power generation processes utilizing a gaseous hydrocarbon feed, which includes splitting the hydrocarbon feed into two portions; a first portion ≤45% by volume of the feed and a second portion ≥55% by volume of the feed, feeding the first portion to an autothermal reforming process to generate a hydrogen-containing gas and a carbon dioxide stream, combining the hydrogen-containing stream with the second portion, combusting the resulting hydrogen-containing fuel stream with oxygen containing gas in a gas turbine to generate electrical power and passing the exhaust gas mixture from the gas turbine to a heat recovery steam generation system that feeds one or more steam turbines to generate additional electrical power. The captured carbon dioxide stream may be fed to storage or enhanced oil recovery processes. The process may be retrofitted into existing combined cycle processes.

17 Claims, 1 Drawing Sheet

(51) Int. Cl.
*C01B 3/50* (2006.01)
*C01B 3/52* (2006.01)
*F01K 17/06* (2006.01)
*F01K 23/06* (2006.01)
*F22B 1/18* (2006.01)

(52) U.S. Cl.
CPC ............... *F01K 17/06* (2013.01); *F01K 23/064* (2013.01); *F22B 1/1807* (2013.01); *C01B 2203/0233* (2013.01); *C01B 2203/0244* (2013.01); *C01B 2203/0283* (2013.01); *C01B 2203/0288* (2013.01); *C01B 2203/0405* (2013.01); *C01B 2203/0415* (2013.01); *C01B 2203/0495* (2013.01); *C01B 2203/06* (2013.01); *C01B 2203/0838* (2013.01); *C01B 2203/0894* (2013.01); *C01B 2203/1011* (2013.01); *C01B 2203/1047* (2013.01); *C01B 2203/1058* (2013.01); *C01B 2203/1076* (2013.01); *C01B 2203/1082* (2013.01); *C01B 2203/127* (2013.01); *C01B 2203/1235* (2013.01); *C01B 2203/1241* (2013.01); *C01B 2203/1294* (2013.01); *C01B 2203/143* (2013.01); *C01B 2203/84* (2013.01); *F05D 2260/61* (2013.01); *Y02E 20/16* (2013.01)

(56) References Cited

U.S. PATENT DOCUMENTS

| 2008/0155984 A1 | 7/2008 | Liu et al. | |
|---|---|---|---|
| 2009/0229239 A1* | 9/2009 | Keller et al. | 60/39.182 |
| 2010/0083666 A1* | 4/2010 | Brook et al. | 60/780 |

FOREIGN PATENT DOCUMENTS

| WO | WO-02/48027 A1 | 6/2002 |
| WO | WO-03/062142 A1 | 7/2003 |
| WO | WO-2008/074980 A1 | 6/2008 |

OTHER PUBLICATIONS

Corradetti et al., "Analysis of Gas-Steam Combined Cycles With Natural Gas Reforming and CO2 Capture," *Journal of Engineering for Gas Turbines and Power*, Jul. 2005, vol. 127, pp. 545-552.

International Search Report dated Feb. 4, 2011, from PCT International Application No. PCT/GB2010/051990.

* cited by examiner

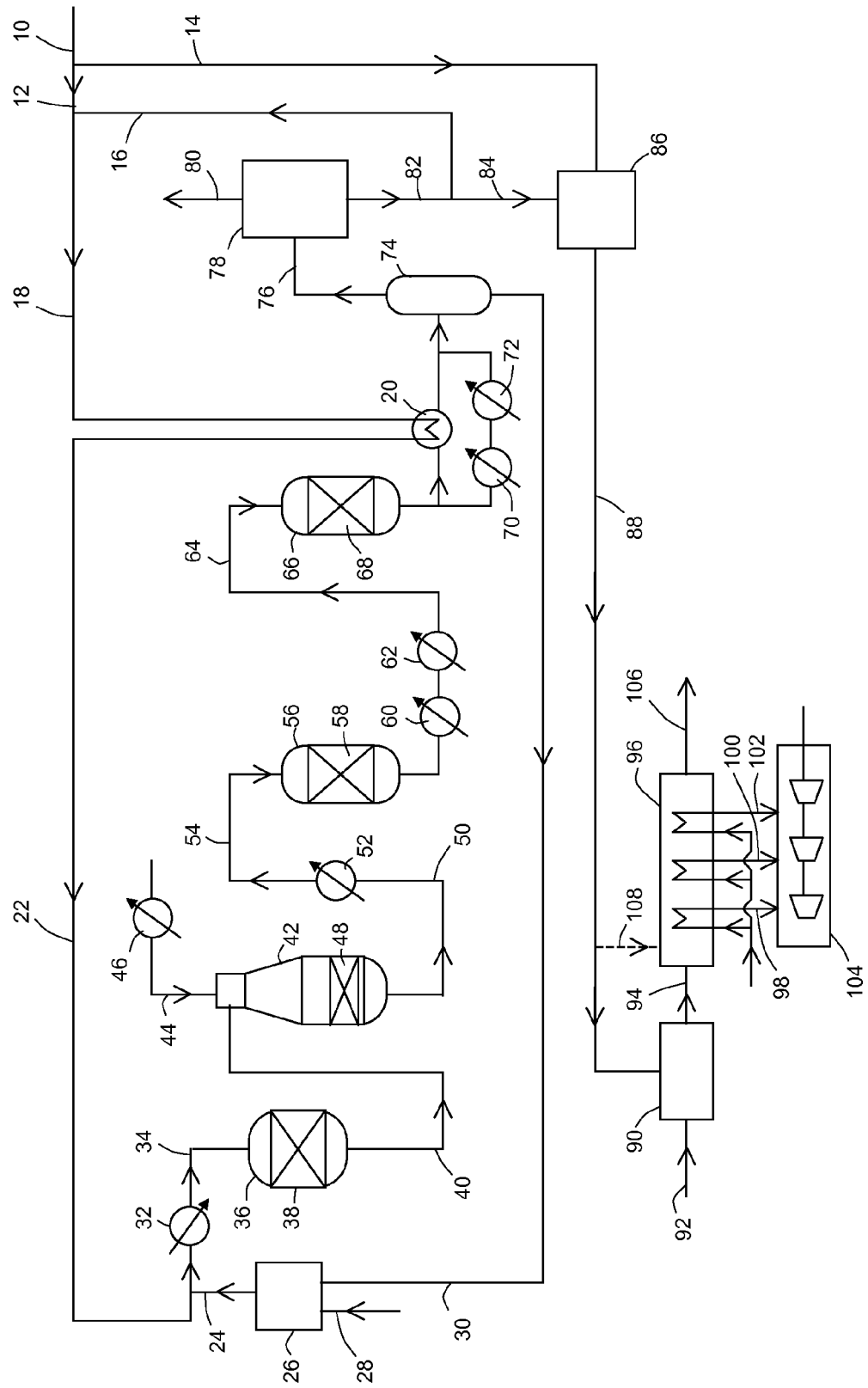

CONVERSION OF HYDROCARBONS TO CARBON DIOXIDE AND ELECTRICAL POWER

CROSS-REFERENCE TO RELATED APPLICATIONS

This application is the U.S. National Phase application of PCT International Application No. PCT/GB2010/051990, filed Nov. 30, 2010, and claims priority of British Patent Application No. 0922410.6, filed Dec. 22, 2009, the disclosures of both of which are incorporated herein by reference in their entireties for all purposes.

FIELD OF THE INVENTION

This invention relates to processes for the conversion of hydrocarbons, such as natural gas, to carbon dioxide and electrical power.

BACKGROUND OF THE INVENTION

Processes for converting natural gas to $CO_2$ and electricity via so-called natural gas combined cycle (NGCC) processes are becoming increasingly important as power producers seek routes to reduce carbon dioxide emissions.

US 2008/0155984 discloses a process for producing power and partially capturing $CO_2$ comprising stream reforming a mixture of hydrocarbon and steam at <800° C. to form a first reformate stream, subjecting the first reformate stream to the water-gas shift reaction to form a second reformate stream having an increased hydrogen content, removing a portion of $CO_2$ from the second reformate stream to generate a third reformate stream (wherein <50% of the carbon in the first reformate stream is removed), combusting the third reformate stream in a gas turbine to generate power and an exhaust gas stream, utilizing heat in the exhaust gas stream in a heat recovery steam generator to generate steam, and using the steam to generate additional power.

This process has the drawback that the steam reforming reactions are endothermic and consume considerable amounts of energy that would better be converted to power. Indeed in the aforesaid US2008/0155984, the inventors have sought to overcome this drawback by performing the steam reforming reactions in the heat recovery steam generator. It is also not readily retrofitted into an existing NGCC plant.

SUMMARY OF THE INVENTION

We have developed a process in which the energy demands of the reforming process are met, whilst at the same time simplifying integration of the reforming and $CO_2$-capture stages into existing processes.

Accordingly the invention provides a process for reducing the $CO_2$ emissions from a combined cycle power generation process utilizing a gaseous hydrocarbon feed, comprising the steps of:
(i) dividing the hydrocarbon feed into two portions; a first smaller portion comprising 45% by volume of the feed and a second larger portion comprising 55% by volume of the feed,
(ii) subjecting a mixture comprising the first portion and steam to adiabatic steam reforming by passing the mixture though a bed of steam reforming catalyst, to form a pre-reformed gas mixture,
(iii) autothermally reforming the pre-reformed gas mixture by partially combusting the pre-reformed gas mixture with an oxygen-containing gas and bringing the resultant partially combusted gas towards equilibrium over a reforming catalyst in an autothermal reformer, to form a reformed gas mixture comprising hydrogen, steam and carbon oxides,
(iv) increasing the hydrogen content of the reformed gas mixture by subjecting it to one or more water-gas-shift stages thereby producing a hydrogen enriched reformed gas,
(v) cooling the hydrogen-enriched reformed gas to below the dew point of the steam therein to condense water and separating condensed water to give a de-watered hydrogen-enriched reformed gas,
(vi) passing the de-watered hydrogen-enriched reformed gas to one or more stages of carbon dioxide separation to generate a carbon dioxide stream and a hydrogen-containing stream,
(vii) mixing the hydrogen-containing stream with the second portion of the gaseous hydrocarbon feed to form a hydrogen-containing fuel stream, and
(viii) combusting the hydrogen-containing fuel stream with an oxygen containing gas in a gas turbine to generate electrical power and an exhaust gas mixture, and passing the exhaust gas mixture to a heat recovery steam generation system to provide steam for one or more steam turbines to generate additional electrical power.

The process may be retrofitted into an existing combined cycle power generation plant utilizing a gaseous hydrocarbon feed.

Accordingly the invention further provides a method of reducing the $CO_2$ emissions from an existing combined cycle power plant fed with a gaseous hydrocarbon feed stream, said plant comprising a gas turbine and a heat recovery steam generation system linked to steam turbines, by:
(a) installing apparatus comprising:
  (i) means to divide the hydrocarbon feed stream into a first portion comprising ≤45% by volume of the feed and a second larger portion comprising ≥55% by volume of the feed,
  (ii) means for adding steam to the first portion,
  (iii) a prereformer containing a prereforming catalyst,
  (iv) an autothermal reformer containing an autothermal reforming catalyst to produce a reformed gas comprising hydrogen, steam and carbon oxides,
  (v) a shift vessel containing a bed of water-gas shift catalyst to produce a hydrogen-enriched reformed gas,
  (vi) cooling and condensate separation equipment, to produce a de-watered hydrogen enriched reformed gas,
  (vii) carbon dioxide separation equipment to separate a carbon dioxide stream from the hydrogen enriched de-watered reformed gas thereby generating a hydrogen-containing stream, and
  (viii) mixing equipment to combine the hydrogen-containing gas stream with the second hydrocarbon portion to generate a hydrogen-containing fuel gas stream,
(b) operating the apparatus to generate a hydrogen-containing fuel gas stream and a carbon dioxide stream, and
(c) recovering the carbon dioxide stream.

The recovered carbon dioxide stream may, for example, be sent to storage and/or used in enhanced oil recovery processes.

BRIEF DESCRIPTION OF THE DRAWING

The invention is illustrated by reference to the accompanying drawing in which;

FIG. 1 is a diagrammatic flowsheet of one embodiment of the invention.

DETAILED DESCRIPTION OF THE INVENTION

In the process of the invention the hydrocarbon feedstock may be any gaseous or low boiling hydrocarbon feedstock such as natural gas, associated gas, LPG, petroleum distillate or naphtha. It is preferably methane, associated gas or natural gas containing a substantial proportion, e.g. over 85% v/v methane. Natural gas is an especially preferred feedstock.

The gaseous hydrocarbon feed is divided into two portions; a first smaller portion comprising ≤45% by volume of the feed and a second larger portion comprising ≥55% by volume of the feed. Preferably the first portion is 15-40% by volume, more preferably 20-35% by volume of the feed, and especially in the range 25-35% by volume. This reduces the size of the reformer apparatus and cost, and at the same time offers the opportunity to the operator to reduce gaseous $CO_2$ emissions to within desired/legislative limits.

The first portion is typically compressed to a pressure in the range 10-100 bar abs. If the feedstock contains sulphur compounds, before, or preferably after compression, the first portion is subjected to desulphurisation, e.g. hydrodesulphurisation using Co or Ni catalysts and absorption of hydrogen sulphide using a suitable absorbent, e.g. a zinc oxide bed. To facilitate this hydrogen may be added to the first portion. The amount of hydrogen in the resulting mixed gas stream may be in the range 1-20% vol, but is preferably in the range 1-10%, more preferably in the range 1-5%. In a preferred embodiment a portion of the hydrogen-containing fuel stream is mixed with the first portion.

The first portion is also preheated. Various hot gas sources are provided in the present process. However in a preferred embodiment, the first portion is heated by heat exchange with the hydrogen-enriched reformed gas mixture.

The first portion is mixed with steam: this steam introduction may be effected by direct injection of steam and/or by saturation of the feed by contact of the latter with a stream of heated water. The amount of steam introduced may be such as to give a steam ratio of 1 to 3, preferably 1 to 2, i.e. 1 to 2 moles of steam per gram atom of hydrocarbon carbon in the first portion. The amount of steam is preferably minimised as this leads to a lower cost, more efficient process.

The resultant hydrocarbon/steam mixture is then subjected to a step of adiabatic low temperature steam reforming. In such a process, the hydrocarbon/steam mixture is heated, typically to a temperature in the range 400-650° C., and then passed adiabatically through a bed of a suitable catalyst, usually a catalyst having a high nickel content, for example above 40% by weight. During such an adiabatic low temperature reforming step any hydrocarbons higher than methane react with steam to give a mixture of methane, carbon oxides and hydrogen. The use of such an adiabatic reforming step, commonly termed pre-reforming, is desirable to ensure that the feed to the autothermal reformer contains no hydrocarbons higher than methane and also contains a significant amount of hydrogen. This may be desirable in cases of low steam ratio mixtures in order to minimise the risk of soot formation in the autothermal reformer.

In the present invention the pre-reformed gas, which comprises methane, hydrogen, steam and carbon oxides, is fed to an autothermal reformer in which it is subjected to autothermal reforming. If desired the temperature and/or pressure of the pre-reformed gas may be adjusted before feeding it to the autothermal reformer.

The autothermal reformer will generally comprise a burner disposed at the top of the reformer, to which is fed the pre-reformed gas and an oxygen-containing gas, a combustion zone beneath the burner through which a flame extends above a fixed bed of particulate steam reforming catalyst. In autothermal reforming, the heat for the endothermic steam reforming reactions is provided by combustion of hydrocarbon in the feed gas. The pre-reformed gas is fed to the top of the reformer and the oxygen-containing gas fed to the burner, mixing and combustion occur downstream of the burner generating a heated gas mixture which is brought to equilibrium as it passes through the steam reforming catalyst. Whereas some steam may be added to the oxygen containing gas, preferably no steam is added so that the low overall steam ratio for the reforming process is achieved. The autothermal reforming catalyst may be a conventional autothermal reforming catalyst, e.g. nickel supported on a refractory support such as rings or pellets of calcium aluminate cement, alumina, titania, zirconia and the like. In one embodiment, the autothermal reforming catalyst comprises a layer of a higher activity Rh-on-zirconia catalyst over a conventional Ni-on-alumina catalyst to reduce catalyst support volatilisation. This is particularly useful when the oxygen-containing gas is oxygen rather than air.

The oxygen-containing gas may be substantially pure oxygen, air, or an oxygen-enriched air mixture; however in the present invention, it is preferably air. Using air alone removes the need for a costly and energy demanding air separation unit (ASU).

The amount of oxygen-containing gas required in the autothermal reformer is determined by the desired composition of the product gas. In general, increasing the amount of oxygen, thereby increasing the temperature of the reformed gas leaving the autothermal reformer, causes the $[H_2]/[CO]$ ratio to decrease and the proportion of carbon dioxide to decrease.

The amount of oxygen-containing gas added is preferably such that 40 to 60 moles of oxygen are added per 100 gram atoms of hydrocarbon fed to the pre-reforming and autothermal reforming stages. Preferably the amount of oxygen added is such that the autothermally reformed gas leaves the autothermal reforming catalyst at a temperature in the range 800-1050° C. For a given feedstock/steam mixture, amount and composition of the oxygen-containing gas and reforming pressure, this temperature largely determines the composition of the autothermally-reformed gas.

After leaving the autothermal reformer, the autothermally-reformed gas is then cooled in one or more steps of heat exchange, generally including at least a first stage of steam raising. In one embodiment, at least a portion of the steam generated in this way is fed to steam turbines to generate electrical power. Preferably, following such steam raising the reformed gas is cooled by heat exchange with one or more of the following streams; the first portion of gaseous hydrocarbon, water, including condensate, used to generate steam for the pre-reforming stage, the mixture of first portion and steam, the pre-reformed gas mixture, the shifted gas mixture, one or more streams fed to or used in the $CO_2$ recovery unit, the hydrogen-containing stream recovered from the $CO_2$-recovery unit, the second portion of gaseous hydrocarbon, the hydrogen-containing fuel stream fed to the gas turbine and one or more steam streams recovered from the heat recovery steam generation system. For safety reasons the reformed gas is preferably not used to heat the oxygen-containing gas fed to the autothermal reformer.

The autothermally-reformed gas comprises hydrogen, carbon monoxide, carbon dioxide, steam, a small amount of unreacted methane, and where air is used as oxidant, nitrogen and a small amount of argon. Preferably the hydrogen content of the autothermally-reformed gas is in the range 30-40% vol and the CO content in the range 5-15% vol. In the present invention, the hydrogen content of the partially cooled reformed gas mixture is increased by subjecting it to one or more water-gas-shift stages thereby producing a hydrogen enriched reformed gas stream and at the same time converting carbon monoxide to carbon dioxide. The reaction may be depicted as follows;

$$CO + H_2O \leftrightarrow CO_2 + H_2$$

Because the pre-reforming is performed with an excess of steam it is generally not necessary to add steam to the autothermally reformed gas mixture to ensure sufficient steam is available for the water gas shift reaction. However if desired, steam may be introduced into the autothermally reformed gas upstream of the shift stage.

Whereas one shift stage employing a suitably stable and active shift catalyst may be employed, the partially cooled reformed gas is preferably subjected to two or more water gas shift stages comprising high temperature shift, medium temperature shift and low temperature shift. In this way the favourable equilibrium at low temperature may be used to maximise hydrogen formation, along with conversion of carbon monoxide to carbon dioxide. By using two or more shift stages, extremely low CO levels in the shifted gas are possible.

High temperature shift is conventionally operated adiabatically with inlet temperatures in the range 340-360° C. over a reduced iron catalyst, such as chromic-promoted magnetite.

Medium and low temperature shift stages may be performed using supported copper-catalysts, particularly the known copper/zinc oxide/alumina compositions. In low temperature shift, a gas containing carbon monoxide (preferably under 4% v/v on a dry basis) and steam (steam to total dry gas molar ratio typically in range 0.3 to 1.5) is passed over the catalyst in an adiabatic fixed bed at an outlet temperature in the range 200 to 300° C. at a pressure in the range 15-50 bar abs. Usually the inlet gas is the product of "high temperature shift" in which the carbon monoxide content has been decreased by reaction over an iron-chromia catalyst at an outlet temperature in the range 400 to 500° C., followed by cooling by indirect heat exchange. The outlet carbon monoxide content is typically in the range 0.1 to 1.0%, especially under 0.5% v/v on a dry basis.

Alternatively in medium temperature shift, the gas containing carbon monoxide and steam is fed at a pressure in the range 15-50 bar abs to the catalyst at an inlet temperature typically in the range 200 to 240° C. although the inlet temperature may be as high as 280° C., and the outlet temperature is typically up to 300° C. but may be as high as 360° C.

Adiabatic operation of the shift stages results in an increase in the temperature of the shifted gas mixtures and subsequent heat exchange with one or more process fluids is generally desirable. Where the shift stage comprises a high temperature shift stage, two stages of heat exchange are preferable; in the first or both stages, the hot shifted gas mixture may be cooled by heat exchange with water under pressure, or the second stage may be heat exchanged with the first portion hydrocarbon feed stream. Where the shift stage comprises a medium-temperature or low-temperature shift stage, at least a portion of the hot shifted gas is preferably cooled by heat exchange with the first portion hydrocarbon feed stream.

Whereas the low temperature- and medium-temperature shift reactions may be operated adiabatically it is also possible to operate them isothermally, i.e. with heat exchange in the shift converter such that the reaction in the catalyst bed occurs in contact with heat exchange surfaces. The coolant conveniently may be water under such a pressure such that partial, or complete, boiling takes place. A suitable pressure is 15 to 50 bar abs and the resulting steam can be used, for example, to drive a turbine or to provide process steam for shift, or for an upstream stage in which the shift feed gas is generated. The water can be in tubes surrounded by catalyst or vice versa.

Following the one or more shift stages, the hydrogen enriched reformed gas is cooled to a temperature below the dew point so that the steam condenses. The condensed steam may then be separated using one or more, e.g. two, conventional separators. The cooling to effect condensation of the steam may be effected by contacting the shifted gas with a stream of cold water: as a result a stream of heated water is formed which may be used to supply some or all of the steam required for reforming. Preferably, the condensed water is fed to a steam generator such as a steam stripper or saturator to provide at least a portion of the steam required for pre-reforming. Because the condensate may contain ammonia, methanol, hydrogen cyanide and $CO_2$, returning the steam from the generator offers a useful way of returning hydrogen and carbon to the process.

Typically the shifted gas contains 10 to 20% by volume of carbon dioxide (on a dry basis). In the present invention, after separation of the condensed water, carbon dioxide is separated from the resulting de-watered shifted gas to generate a hydrogen-containing gas stream. The carbon dioxide separation stage may be performed using an amine- or physical wash-solvent system. Alternatively the carbon dioxide separation stage may be performed using a membrane system or a pressure swing adsorption system.

The carbon dioxide may be separated by a conventional acid gas recovery (AGR) process. In the conventional AGR process the dewatered hydrogen-enriched shifted gas is contacted with a stream of a suitable absorbent liquid, such as an amine, particularly methyl diethanolamine (MDEA) solution so that the carbon dioxide is absorbed by the liquid to give a laden absorbent liquid and a gas stream having a decreased content of carbon dioxide. The laden absorbent liquid is then regenerated, for example by heating, to desorb the carbon dioxide and to give a regenerated absorbent liquid, which is then recycled to the carbon dioxide absorption stage. Heat for desorbing the carbon dioxide may usefully be provided by the reformed gas mixture and/or the shifted gas mixture. If the carbon dioxide separation step is operated as a single pressure process, i.e. essentially the same pressure is employed in the absorption and regeneration steps, only a little recompression of the recycled carbon dioxide will be required. Unless it is desired that the product gas has a very low carbon dioxide content, it is generally not necessary to effect the regeneration of the absorbent liquid to a very low carbon dioxide content.

Alternatively, suitable membrane technology for separation of $CO_2$ is commercially available and may be used to generate very pure $CO_2$ streams, e.g. >95% v/v $CO_2$, preferably >98% v/v $CO_2$.

The recovered carbon dioxide, e.g. from the AGR process or membrane separator, may be compressed and used for the manufacture of chemicals, or sent to storage and/or used in enhanced oil recovery (EOR) processes. In cases where the $CO_2$ is to be compressed for storage, transportation or use in EOR processes, the $CO_2$ is preferably first dried to prevent liquid water present in trace amounts, from condensing. The $CO_2$ is preferably dried to a dew point≤−10° C. by passing it through a bed of a suitable desiccant, such as a zeolite, or contacting it with a glycol in a glycol drying unit.

In one embodiment, a portion of the recovered carbon dioxide is recycled to the reforming step. The recycled carbon dioxide stream may be added to the feedstock prior to feeding the latter to the pre-reformer or to the pre-reformed gas mixture before the latter is fed to the autothermal reformer. Where the recycled carbon dioxide is added to the pre-reformed gas, rather than to the feedstock prior to pre-reforming, there is an advantage that the pre-reforming process can be operated at a lower steam ratio.

Subsequent to the stage of carbon dioxide separation, before the hydrogen containing gas is combined with the second portion of gaseous hydrocarbon feedstock, at least a portion of it may be subjected to a step of hydrogen separation, e.g. through a membrane in order to provide pure hydrogen for hydrodesulphurisation of the hydrocarbon feed or to add to the hydrocarbon upstream of the pre-reforming stage.

The separation and recovery of the carbon dioxide produces a hydrogen-containing gas comprising principally hydrogen and, where air is used as oxidant in the autothermal reforming step, nitrogen, with small amounts of residual steam, methane, carbon monoxide and carbon dioxide. The hydrogen content is desirably in the range 55-65% vol.

In the present invention, the hydrogen containing gas is mixed with the second portion of the gaseous hydrocarbon to form a hydrogen-containing fuel stream. Preferably the hydrogen-containing fuel stream comprises ≤50% by volume $H_2$, more preferably ≤40% by volume $H_2$, most preferably ≤35% by volume $H_2$, especially 25-35% by volume. The hydrogen-containing gas and second hydrocarbon portion may be combined in a separate mixing unit or fed to and mixed within the gas turbine apparatus.

In the present invention, at least part of the hydrogen-containing fuel stream is mixed with an oxygen-containing gas such as air or oxygen-enriched air and combusted in a gas turbine, wherein the gas turbine drives an electric generator thereby producing electricity. Conventional gas turbine operating apparatus and conditions may be used. The oxygen-containing gas is preferably air as this removes the need for an ASU and improves the effectiveness of the gas turbine. Steam need not be added to the gas turbine feed to suppress $NO_x$ formation when air is used as the oxygen-containing gas in the autothermal reforming step.

The gas turbine comprises an air compressor, combustor and turbine connected to a generator for generating electrical power. The turbine exhaust gas is used to generate steam, which is fed to one or more steam turbines connected to one or more generators to produce additional electricity. Thus, in addition to electricity generation from the gas turbine, electricity is also generated by one or more steam turbines fed by a heat recovery steam generator (HRSG) using the heat in the exhaust gas from the gas turbine. Preferably the heat recovery steam generation system generates high-pressure, intermediate-pressure and low-pressure steam fed to high-pressure, intermediate-pressure and low-pressure steam turbines. High and intermediate pressure steam generated by heat exchange of the reformed and shifted gas mixtures with water and/or steam under pressure may also be fed to the steam turbines if desired. Furthermore the exhaust gas from the gas turbine may, if desired, be used to heat one or more process fluid streams including the oxygen-containing gas fed to the autothermal reformer as well as boiler feed water at pressure.

If it is desired to increase the temperature of the exhaust gas, this may be done using a burner fed with a portion of the exhaust gas, which contains oxygen, and a suitable portion of a fuel stream selected from the hydrocarbon feed, the hydrogen-containing fuel gas or a mixture of these, although again burning hydrocarbon to do so is less preferred where it is desired to maximise the carbon capture.

Typically, the heat recovery unit is a heat recovery and steam generator unit (HRSG) that generates and superheats additional steam for use in the steam turbine and elsewhere in the process of the present invention. Thus, in addition to superheating steam and heating any process streams such as the air feed stream and the high pressure water feed to the waste heat boiler(s), the HRSG is capable of generating high pressure (HP) steam, medium pressure (MP) steam and low pressure (LP) steam and of superheating these steam streams. The HRSG may also be capable of reheating MP steam that is produced as an exhaust stream from the high-pressure stage of a multistage steam turbine.

The HRSG will typically comprise a plurality of heating coils through which the various process streams may be passed in heat exchange relationship with the exhaust gas. A conventional HRSG arrangement may be used wherein the exhaust gas contacts the heating coils for the production of and superheating of the HP, MP and LP steam, and for heating boiler feed water. The exhaust gas will be progressively cooled as it is heat exchanged with the various process streams.

Preferably, the superheated HP steam that is produced in the HRSG is at a pressure in the range 80 to 200 barg and a temperature in the range 450 to 600° C. Preferably, the superheated MP steam that is generated in the HRSG is at a pressure in the range 20 to 50 barg and a temperature in the range 300 to 400° C. Preferably, the superheated LP steam that is generated in the HRSG is at a pressure in the range 2 to 10 barg and a temperature in the range 200 to 300° C.

The cooled exhaust gas is discharged from the HRSG to the atmosphere through a stack. Preferably, the stack is provided with a continuous emission monitoring system for monitoring, for example, the NOx content of the cooled exhaust gas. The HP steam that is generated and superheated in the HRSG may be mixed with the HP steam from the waste heat boiler(s) (that is superheated in the HRSG) and the combined superheated HP steam passed to the HP stage of the steam turbine. If desired, a first portion of the MP steam exhaust from the high pressure stage of the steam turbine may be fed to the MP reheater coil of the HRSG and the re-heated MP steam then delivered to the medium pressure stage (middle stage) of the steam turbine. If desired, a second portion of the MP steam exhaust from the high pressure stage of the steam turbine may be used as MP steam for the steam reforming and water-gas shift conversion and optionally to strip impurities from the process condensate.

Where the $CO_2$ recovery uses a physical or amine wash solvent as sorbent, a portion of the LP steam generated in the HRSG may, if desired, be used to heat and thereby desorb $CO_2$ out of the sorbent. However, preferably the LP steam is superheated in the HRSG and is delivered to the low pressure stage (final stage) of the steam turbine.

Thus in a preferred embodiment, the present invention offers a process for reducing the $CO_2$ emissions from a combined cycle power generation process using a natural gas feed, comprising splitting the natural gas into two portions, feeding the first, smaller, portion to an autothermal reforming process to generate a hydrogen-containing gas and a carbon dioxide stream, combining the hydrogen-containing stream with the second larger natural gas portion, combusting the resulting hydrogen-containing fuel stream with an oxygen containing gas in a gas turbine to generate electrical power and passing the exhaust gas mixture from the gas turbine to a heat recovery steam generation system that feeds one or more steam turbines to generate additional electrical power. The captured carbon dioxide stream may be fed to storage or enhanced oil recovery processes. The process may be usefully retrofitted into existing NGCC processes.

In FIG. 1 a natural gas stream comprising >85% vol methane fed via line 10 is divided into two streams; a first portion 12 comprising about 33% by volume of stream 10 and a second portion 14 comprising about 66% by volume of stream 10. The first portion 12 is mixed with a hydrogen-containing stream 16 such that the resulting mixture contains between 1 and 5% vol hydrogen. The hydrogen-containing natural gas stream is fed via line 18 to heat exchanger 20. The heated natural gas mixture in line 22 is mixed with steam fed from line 24 at a steam to carbon ratio of about 2. The steam is generated in a steam stripper 26 fed with water 28 and a condensate stream 30. The natural gas/steam mixture is heated in heat exchanger 32 and fed via line 34 to a pre-reformer 36 containing a fixed bed of pelleted nickel-based steam reforming catalyst 38. The higher hydrocarbons are converted to methane and a portion of the methane is steam reformed and as the mixture passes over the Ni steam reforming catalyst. The resulting pre-reformed gas mixture is then fed directly via line 40 to the burner region of an autothermal reformer 42, where it is partially combusted with air fed via line 44 that has been preheated in heat exchanger 46. (Heat exchanger 46 may be stand-alone as depicted or may be integrated with the heat-recovery steam generator). The hot combusted gas mixture is brought towards equilibrium over a fixed bed of a pelleted nickel-based autothermal reforming catalyst 48 disposed below the combustion zone in the autothermal reformer 42. The resulting hot autothermally reformed gas mixture is fed from the autothermal reformer 42 via line 50 to steam-raising heat exchanger 52 where its temperature is adjusted before it is fed via line 54 to a first shift vessel 56 containing a fixed bed of particulate iron-based high temperature shift catalyst 58. The water-gas shift reaction whereby the hydrogen content of the reformed gas is increased and the carbon monoxide converted to carbon dioxide occurs as the gas passes through the bed. The partially shifted reformed gas is fed from the first shift reactor 56 through heat exchangers 60 and 62 in which it is cooled with water under pressure before being fed via line 64 to a second shift vessel 66 containing a fixed bed of a particulate copper-based low-temperature shift catalyst 68. The water-gas shift reaction moves further to completion as the gas passes through the bed. The resulting hydrogen-enriched shifted gas mixture is then cooled. A portion is cooled in heat exchange with the hydrocarbon/hydrogen feed stream in heat exchanger 20 and the remaining portion in heat exchange with water under pressure in heat exchangers 70 and 72. The cooling lowers the temperature of the gas mixture to below the dew point so that water condenses. The combined cooled stream is fed to a separator 74 in which the condensate is separated from the gas mixture. The condensate stream is fed from the separator 74 to the steam stripper 26 via line 30. In this way volatile organics formed during the reforming and shift stages may be returned to the process. The dewatered gas mixture is fed from the separator 74 via line 76 to an acid gas removal unit (AGRU) 78 operating with a solvent wash system that absorbs $CO_2$ from the gas. The absorbed $CO_2$ is recovered from the solvent in the AGRU 78 and then sent via line 80 for compression and storage. A hydrogen-containing gas stream 82 is recovered from the AGRU by post membrane or PSA, and then recompressed. A portion of the hydrogen-containing stream 82 is subjected to separation of a hydrogen-rich stream (not shown), which is fed via line 16 to the natural gas feed stream 12. The remaining portion 84 of the hydrogen-containing gas is fed to a mixing unit 86 where it is combined with the second portion of natural gas feed 14. The mixed stream containing ≤35% by volume $H_2$ is fed via line 88 from the mixer 86 through one or more further stages of heat exchange, e.g. with the reformed and/or shifted gas streams (not shown), to a gas turbine 90 where it combusted with air fed via line 92 and the combustion gases passed through a turbine connected to a generator (not shown) to generate electrical power. The exhaust gases from the gas turbine are fed via line 94 to a heat recovery steam generator (HRSG) 96 comprising a plurality of coils fed with boiler feed water and steam, so that the HRSG produces a high pressure steam stream 98, a medium or intermediate pressure steam stream 100 and a low pressure steam stream 102, each of which are fed a steam turbine unit 104, which is connected to a generator (not shown) to generate additional electrical power. The spent, cooled exhaust gases from the HRSG, comprising $CO_2$, nitrogen and water vapour with some oxygen, are fed to a NOx-monitored stack via line 106. If desired, a portion of the hydrogen-containing fuel gas may by-pass the gas turbine 90 and be fed to the HRSG via dotted line 106 where it is combusted with the exhaust gas 94 to heat the exhaust gas to a desired higher temperature.

EXAMPLE

The invention is further illustrated by the following calculated example of a process in accordance with the flowsheet depicted in FIG. 1 in which the recovered $CO_2$ from the AGRU is compressed to 100 bar for storage. In the following tables, the pressures (P, in bar abs.), temperatures (T, in ° C.) and flow rates (kmol/h) are quoted, rounded to the nearest integer.

| Stream | 10 | 14 | 12 | 16 | 18 | 22 | 24 | 40 |
|---|---|---|---|---|---|---|---|---|
| Unit | | | | | | | | |
| ° C. | 40 | 40 | 40 | 100 | 180 | 250 | 410 | 453 |
| kPa | 3000 | 3000 | 3000 | 4200 | 2890 | 2660 | 3710 | 2385 |
| kgmole/h | 4300 | 3096 | 1204 | 62 | 1266 | 1266 | 2653 | 4148 |
| kg/h | 79564 | 57286 | 22278 | 902 | 23180 | 23180 | 47754 | 71060 |
| Component (mole %) | | | | | | | | |
| Methane | 87.451 | 87.451 | 87.451 | 0.415 | 83.19 | 83.233 | 0 | 29.167 |
| Propane | 2.191 | 2.191 | 2.191 | 0 | 2.084 | 2.084 | 0 | 0 |
| $H_2O$ | 0 | 0 | 0 | 1.96 | 0.096 | 0.096 | 100 | 58.433 |
| Ethane | 6.979 | 6.979 | 6.979 | 0 | 6.639 | 6.639 | 0 | 0 |
| $CO_2$ | 1.909 | 1.909 | 1.909 | 0 | 1.816 | 1.816 | 0 | 3.335 |
| Nitrogen | 0.99 | 0.99 | 0.99 | 45.64 | 3.173 | 3.173 | 0 | 0.976 |
| CO | 0 | 0 | 0 | 0.42 | 0.02 | 0.02 | 0 | 0.064 |
| Hydrogen | 0 | 0 | 0 | 51.01 | 2.501 | 2.501 | 0 | 8.012 |

-continued

| Stream | 10 | 14 | 12 | 16 | 18 | 22 | 24 | 40 |
|---|---|---|---|---|---|---|---|---|
| n-Butane | 0.409 | 0.409 | 0.409 | 0 | 0.389 | 0.389 | 0 | 0 |
| Oxygen | 0 | 0 | 0 | 0 | 0 | 0 | 0 | 0 |
| n-Pentane | 0.05 | 0.05 | 0.05 | 0 | 0.048 | 0.048 | 0 | 0 |
| Argon | 0 | 0 | 0 | 0.55 | 0.027 | 0.027 | 0 | 0.008 |

| Stream | 44 | 50 | 54 | 64 | 30 | 76 | 80 |
|---|---|---|---|---|---|---|---|
| Unit | | | | | | | |
| °C. | 450 | 900 | 350 | 215 | 50 | 50 | 150 |
| kPa | 3650 | 2315 | 2230 | 2165 | 2125 | 2125 | 10000 |
| kgmole/h | 3903 | 9606 | 9606 | 9606 | 1691 | 7915 | 1295 |
| kg/h | 112625 | 183684 | 183684 | 183684 | 30496 | 153188 | 57002 |
| Component (mole %) | | | | | | | |
| Methane | 0 | 0.29 | 0.29 | 0.29 | 0 | 0.351 | 0 |
| Propane | 0 | 0 | 0 | 0 | 0 | 0 | 0 |
| $H_2O$ | 0.99 | 25.943 | 25.943 | 20.042 | 99.935 | 0.665 | 0 |
| Ethane | 0 | 0 | 0 | 0 | 0 | 0 | 0 |
| $CO_2$ | 0.03 | 5.688 | 5.688 | 11.589 | 0.061 | 16.363 | 100 |
| Nitrogen | 77.314 | 31.833 | 31.833 | 31.833 | 0.004 | 38.632 | 0 |
| CO | 0 | 8.098 | 8.098 | 2.197 | 0 | 0.351 | 0 |
| Hydrogen | 0 | 27.766 | 27.766 | 33.667 | 0 | 43.175 | 0 |
| n-Butane | 0 | 0 | 0 | 0 | 0 | 0 | 0 |
| Oxygen | 20.736 | 0 | 0 | 0 | 0 | 0 | 0 |
| n-Pentane | 0 | 0 | 0 | 0 | 0 | 0 | 0 |
| Argon | 0.93 | 0.381 | 0.381 | 0.381 | 0 | 0.462 | 0 |

| Stream | 84 | 88 | 92 | 94 | 106 | 98 | 100 | 102 |
|---|---|---|---|---|---|---|---|---|
| Unit | | | | | | | | |
| °C. | 230 | 140.5 | 25 | 751 | 150 | 565 | 290 | 165 |
| kPa | 2125 | 1700 | 98.06652 | 175 | 120 | 16400 | 2160 | 360 |
| kgmole/h | 6558 | 9654 | 101806 | 109953 | 109953 | 41995 | 41995 | 53815 |
| kg/h | 95287 | 152573 | 2937129 | 3089688 | 3089688 | 756543 | 756543 | 969485 |
| Component (mole %) | | | | | | | | |
| Methane | 0.419 | 28.329 | 0 | 0 | 0 | 0 | 0 | 0 |
| Propane | 0 | 0.702 | 0 | 0 | 0 | 0 | 0 | 0 |
| $H_2O$ | 0.795 | 0.54 | 0 | 9.007 | 9.007 | 100 | 100 | 100 |
| Ethane | 0 | 2.238 | 0 | 0 | 0 | 0 | 0 | 0 |
| $CO_2$ | 0 | 0.612 | 0 | 3.21 | 3.21 | 0 | 0 | 0 |
| Nitrogen | 46.19 | 31.69 | 79 | 75.929 | 75.929 | 0 | 0 | 0 |
| CO | 0.415 | 0.285 | 0 | 0 | 0 | 0 | 0 | 0 |
| Hydrogen | 51.621 | 35.0 | 0 | 0 | 0 | 0 | 0 | 0 |
| n-Butane | 0 | 0.131 | 0 | 0 | 0 | 0 | 0 | 0 |
| Oxygen | 0 | 0 | 21 | 11.829 | 11.829 | 0 | 0 | 0 |
| n-Pentane | 0 | 0.0064 | 0 | 0 | 0 | 0 | 0 | 0 |
| Argon | 0.553 | 0.375 | 0 | 0.033 | 0.033 | 0 | 0 | 0 |

The effect of the present invention is illustrated by the following in which the natural gas consumption, power output, net efficiency and grams $CO_2$ emitted per kilowatt power generated are compared for a current NGCC plant, a partial retrofit according to the present invention with 66% vol natural gas fed to the gas turbine and 33% vol fed to the pre-reformer, and an alternative in which 100% of the natural gas is fed to the pre-reformer.

| | NGCC Current (Comparative) | Partial Retrofit | Full Carbon Capture (Comparative) |
|---|---|---|---|
| Natural gas useage (kmol/h) | 4300 | 4300 | 4300 |
| Power Output (MW) | 590-610 | 540 | 440 |
| Net Efficiency (% LHV) | 56-57 | 52-53 | 43 |
| $g_{CO2}/KW_{electricity}$ | 348-350 | 250-260 | 30 |

In this flowsheet, the partial retrofit offers only a small reduction in power and efficiency compared to the current NGCC but with a significant amount of $CO_2$ capture. Full carbon capture dramatically reduces the $g_{CO2}$/KW, but also markedly affects the power output and efficiency for the same natural gas feed rate as well as a significantly increased capital expenditure.

The invention claimed is:

1. A process for reducing carbon dioxide emissions from a combined cycle power generation process utilizing a gaseous hydrocarbon feed, comprising the steps of:
   (i) dividing the gaseous hydrocarbon feed into two portions; a first smaller portion comprising ≤45% by volume of the gaseous hydrocarbon feed and a second larger portion comprising ≥55% by volume of the gaseous hydrocarbon feed,
   (ii) subjecting a mixture comprising the first smaller portion and steam to adiabatic steam reforming by passing the mixture though a bed of steam reforming catalyst, to form a pre-reformed gas mixture,
   (iii) autothermally reforming the pre-reformed gas mixture by partially combusting the pre-reformed gas mixture with an oxygen-containing gas to form a partially combusted gas and bringing the partially combusted gas towards equilibrium over a reforming catalyst in an autothermal reformer, thereby forming a reformed gas mixture comprising hydrogen, steam and carbon oxides,
   (iv) increasing the hydrogen content of the reformed gas mixture by subjecting it to one or more water-gas-shift stages thereby producing a hydrogen-enriched reformed gas,
   (v) cooling the hydrogen-enriched reformed gas to below the dew point of the steam therein to condense water and separating condensed water to give a de-watered hydrogen-enriched reformed gas,
   (vi) passing the de-watered hydrogen-enriched reformed gas to one or more stages of carbon dioxide separation to generate a carbon dioxide stream and a hydrogen-containing stream,
   (vii) mixing the hydrogen-containing stream with the second larger portion of the gaseous hydrocarbon feed to form a hydrogen-containing fuel stream, and
   (viii) combusting the hydrogen-containing fuel stream with a second oxygen-containing gas in a gas turbine to generate electrical power and an exhaust gas mixture, and passing the exhaust gas mixture to a heat recovery steam generation system to provide steam for one or more steam turbines to generate additional electrical power.

2. A process according to claim 1 wherein the gaseous hydrocarbon feed comprises >85% v/v methane.

3. A process according to claim 1 wherein the first smaller portion is 15-40% by volume of the gaseous hydrocarbon feed.

4. A process according to claim 1 wherein a portion of the hydrogen-containing stream is mixed with the first smaller portion of the gaseous hydrocarbon feed prior to mixing with steam.

5. A process according to claim 1 wherein the first smaller portion of the gaseous hydrocarbon feed is heated prior to pre-reforming by heat exchange with the hydrogen-enriched reformed gas.

6. A process according to claim 1 wherein the oxygen-containing gas fed to the autothermal reformer is air.

7. A process according to claim 1 wherein the reformed gas mixture is cooled in one or more steps of heat exchange, including at least a first stage of steam raising followed by heat exchange with one or more of the following streams; the first smaller portion, water used to generate steam for the pre-reforming stage, the mixture of the first smaller portion and steam, the pre-reformed gas mixture, the oxygen-containing gas fed to the autothermal reformer, the hydrogen-enriched reformed gas, one or more streams fed to or used in the one or more stages of carbon dioxide separation, the hydrogen-containing stream, the second larger portion of the gaseous hydrocarbon feed, the hydrogen-containing fuel stream fed to the gas turbine, and one or more steam streams recovered from the heat recovery steam generation system.

8. A process according to claim 1 wherein one or more water-gas-shift stages comprises a high temperature shift stage, a medium temperature shift stage and a low temperature shift stage.

9. A process according to claim 1 wherein the condensed water is fed to a steam generator to provide at least a portion of steam for the adiabatic steam reforming of the mixture comprising the first smaller portion and steam.

10. A process according to claim 1 wherein the one or more carbon dioxide separation stages are performed using an amine- or physical wash-solvent system.

11. A process according to claim 1 wherein the one or more carbon dioxide separation stages are performed using a membrane system.

12. A process according to claim 1 wherein the second oxygen-containing gas fed to the gas turbine is air.

13. A process according to claim 1 wherein the one or more steam turbines comprise high-pressure, intermediate-pressure and low pressure steam turbines and wherein the heat recovery steam generation system generates high-pressure, intermediate-pressure and low-pressure steam fed to the high-pressure, intermediate-pressure and low-pressure steam turbines.

14. A process according to claim 1 wherein the carbon dioxide stream is compressed and used for the manufacture of chemicals, or sent to storage or used in enhanced oil recovery processes.

15. A process according to claim 1 wherein the first smaller portion is 20-35% by volume of the gaseous hydrocarbon feed stream.

16. A process according to claim 1 wherein the first smaller portion is 25-35% by volume of the gaseous hydrocarbon feed stream.

17. A method of reducing carbon dioxide emissions from an existing combined cycle power plant fed with a gaseous hydrocarbon feed stream by an input conduit, said plant comprising a gas turbine and a heat recovery steam generation system linked to steam turbines by:
   (a) installing apparatus comprising:
      (i) a first conduit configured to receive a first portion, comprising ≤45% by volume of the gaseous hydrocarbon feed stream, from the input conduit and a second conduit configured to receive a second larger portion, comprising ≥55% by volume of the gaseous hydrocarbon feed stream, from the input conduit,
      (ii) at least one of a third conduit and a saturator configured to add steam to the first portion in the first conduit, to form a first mixture comprising the first portion and steam,
      (iii) a preformer containing a prereforming catalyst, the pre-reformer configured to receive the first mixture and form a pre-reformed gas mixture, (iv) an autothermal reformer containing an autothermal reforming catalyst to produce, from the pre-reformed gas mixture, a reformed gas comprising hydrogen, steam and carbon oxides,
(v) a shift vessel containing a bed of water-gas shift catalyst to produce, from the reformed gas, a hydrogen-enriched reformed gas,
(vi) cooling and condensate separation equipment, to produce, from the hydrogen-enriched reformed gas, a de-watered hydrogen-enriched reformed gas,
(vii) carbon dioxide separation equipment to separate carbon dioxide from the de-watered hydrogen-enriched reformed gas thereby generating a hydrogen-containing stream and a carbon dioxide stream, and
(viii) mixing equipment to combine the hydrogen-containing gas stream with the second larger portion to generate a hydrogen-containing fuel gas stream,
(b) operating the apparatus to generate the hydrogen-containing fuel gas stream and the carbon dioxide stream, and
(c) recovering the carbon dioxide stream.

\* \* \* \* \*